United States Patent [19]

Yoshida

[11] Patent Number: 4,685,076
[45] Date of Patent: Aug. 4, 1987

[54] VECTOR PROCESSOR FOR PROCESSING ONE VECTOR INSTRUCTION WITH A PLURALITY OF VECTOR PROCESSING UNITS

[75] Inventor: Yaoko Yoshida, Tokyo, Japan

[73] Assignee: Hitachi, Ltd., Tokyo, Japan

[21] Appl. No.: 657,354

[22] Filed: Oct. 3, 1984

[30] Foreign Application Priority Data

Oct. 5, 1983 [JP] Japan .............................. 58-185007

[51] Int. Cl.⁴ .......................................... G06F 15/347
[52] U.S. Cl. ..................................... 364/736; 364/200
[58] Field of Search ............... 364/736, 200 MS File, 364/900 MS File

[56] References Cited

U.S. PATENT DOCUMENTS 4,162,534 7/1979 Barnes ................................. 364/900
4,541,046 9/1985 Nagashima et al. ................ 364/200
4,617,625 10/1986 Nagashima et al. ................ 364/200

FOREIGN PATENT DOCUMENTS 2136172A 9/1984 United Kingdom ............... 364/724

OTHER PUBLICATIONS

Higbie, "Applications of Vector Processing", *Computer Design* Apr. 1978, pp. 139-145.
Lubeck et al, "A Benchmark Comparison of Three Super-computers: Fujitsu VP-2000, Hitachi S810/20, and Cray X-MP/2", *Computer* Dec. 1985, pp. 10-23.

*Primary Examiner*—David H. Malzahn
*Attorney, Agent, or Firm*—Antonelli, Terry & Wands

[57] ABSTRACT

A vector processing apparatus comprises plural vector registers, plural vector arithmetic units, and data transfer circuits. The vector processing apparatus comprises plural vector processing units each having plural vector registers, at least one vector arithmetic unit and at least one data transfer circuit to designate the number of vector elements to be processed for each vector processing unit in executing one vector instruction, thereby carrying out the vector processings corresponding to the number of elements to be essentially processed as a whole.

5 Claims, 3 Drawing Figures

VECTOR PROCESSOR FOR PROCESSING ONE VECTOR INSTRUCTION WITH A PLURALITY OF VECTOR PROCESSING UNITS

BACKGROUND OF THE INVENTION

1. Field of the Invention

This invention relates to a vector processing apparatus.

2. Description of the Prior Art

The conventional vector processing apparatus has a plurality of vector arithmetic units and a plurality of data transfer circuits for performing data transfer between a main storage and vector registers in order to enhance its processing speed. However, there are few vector instructions which are simultaneously executable in actual vector processing so that these plural vector arithmetic units and data transfer circuits are rarely utilized simultaneously. Therefore, the conventional vector processing apparatus has the disadvantages of low utilization efficiency of the vector arithmetic units and the data transfer circuits and of being insufficient for realizing high speed processing.

SUMMARY OF THE INVENTION

Accordingly, an object of this invention is to provide a vector processing apparatus for enhancing the utilization efficiency of vector arithmetic units and/or data transfer circuits and for implementing high speed processing.

In accordance with an aspect of this invention, there is provided a vector processing apparatus comprising plural vector registers, plural vector arithmetic units and plural data transfer circuits, in which there are provided plural processing units each having plural vector registers, at least one vector arithmetic unit at least one data transfer circuit and a holding circuit for designating the number of vector elements to be processed for each vector processing unit in executing one vector instruction, thereby carrying out vector processings corresponding to the number of elements to be essentially processed as a whole.

This invention, together with further objects and advantages thereof, may be better understood from the following description of preferred embodiments, taken in conjunction with the accompanying drawings, in which like reference numerals or symbols refer to like elements.

DESCRIPTION OF THE PREFERRED EMBODIMENTS

Figure 1:
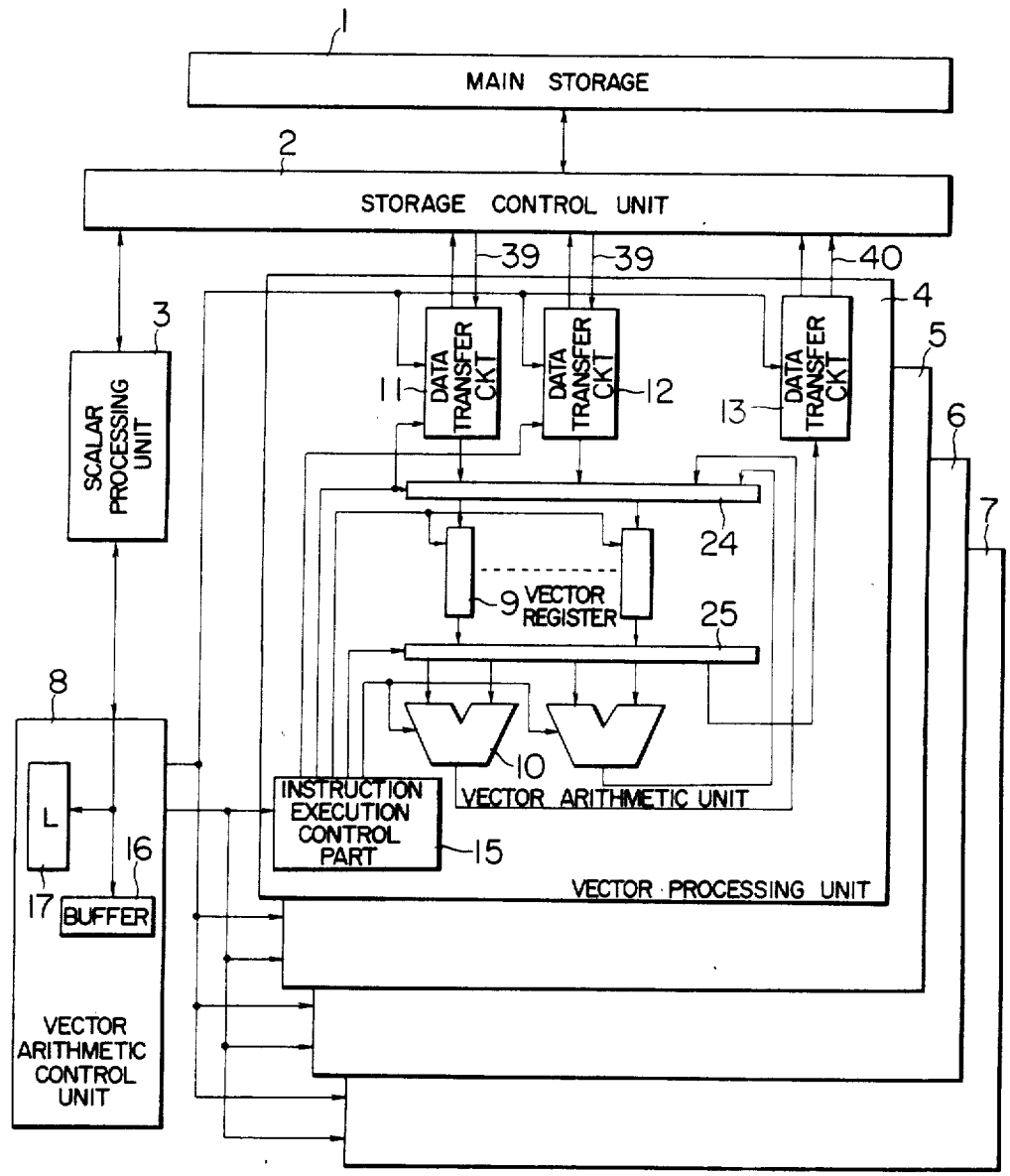
FIG. 1 is an entire schematic block diagram showing an embodiment of the vector processing apparatus according to this invention.

An embodiment of this invention will be explained referring to the drawings.

FIG. 1 shows an entire construction of a vector processing apparatus according to an embodiment of this invention. In this figure, numeral 1 denotes a main storage; 2 a storage control unit; 3 a scalar processing unit; 4-7 vector processing units; and 8 a vector arithmetic control unit for controlling the operation of the vector processing units 4-7. The scalar processing unit 3 is equipped with ordinary processing function well known by those skilled in the art. Each of the vector processing units 4-7 includes plural vector registers 9, one or more vector arithmetic units 10, data transfer circuits 11-13 for performing data transfer to and from the main storage 1 through the storage control unit 2, connection path circuits 24, 25, for forming data paths between the vector registers 9 and the vector arithmetic units 10, and among the data transfer circuits 11-13, and an instruction execution control part 15 connected with above elements, for controlling the entire vector processing unit. In the figure, only the vector processing unit 4 is shown in detail. The other vector processing units 5-7 have also the similar construction.

Incidentally, the data transfer circuits 11 and 12 are for fetching while the data transfer circuit 13 is for storing. The connection paths 24 and 25 are provided independently for each vector processing in the figure but they can be provided in common to all vector processing units.

In the system of FIG. 1, when vector processing is required to be performed while the scalar processing unit 3 processes a certain task, it is performed by the vector processing units 4-7 through the vector arithmetic control unit 8.

Now it is assumed that the following program is executed by the scalar processing unit 3.

DO J0 I = 1, 100

10 A(I) = B(I) + C(I)

This program is, as described below, expanded into one LIN (Load Increment) instruction, three LMA (Load Multiple Address) instructions, and one EXVP (Execute Vector Processing) instruction, which are executed by the scalar processing unit 3, respectively.

LIN INR0, INR2, INR4

: Instruct to set constant to increment registers INR0, INR2, and INR4, respectively, which are prepared in the vector arithmetic control unit 8 as will be described later.

LMA VAR0

: Instruct to set the heading address of row A to a vector address register VAR0 which is prepared in the vector arithmetic control unit 8 as described later.

LMA VAR2

: Instruct to set the heading address of row B to a vector address register VAR2.

LMA VAR4

: Instruct to set the heading address of row C to a vector address register VAR4.

EXVP L,X

: Instruct that the number of vector elements to be processed is L, and read out a row of vector instructions from the address X of the main storage as a heading address to send out to the vector arithmetic control unit 8.

The above instructions of LIN and LMA set the address control data on the rows A, B and C to the vector address registers and increment registers in the vector arithmetic control unit 8, and the EXVP instruction reads out the vector instruction row. This vector instruction row, as described below, consists of two LVR (Load Vector Register) instructions, one VEA (Vector Elementwise Add) instruction and one STVR (Store Vector Register) instruction.

LVR VR2, VAR2, INR2

: Instruct to create the address of the main storage on the basis of the heading address of the row B and constant which are set to the vector address register VAR2 and the increment register INR2, respectively, to read out the data of the row B therefrom, and to set it to the vector register VR2. Incidentally, the above constant is employed as incremental value of the address, which applies in the following description.

LVR VR4, VAR4, INR4

: Instruct to create the address of the main storage on the basis of the heading address of the row and constant which are set to the vector address register VAR4 and the increment register INR4, respectively, to read out the data of the row C therefrom, and to set it to the vector register VR4.

VEA VR6, VR2, VR4

: Instruct to read out the rows B and C from the vector registers VR2 and VR4, respectively, and set the result of addition of both rows to the vector register VR6.

STVR VR6, VAR0, INR0

: Instruct to read out data from the vector register VR6 and to write it in the address of the main storage which has been created on the basis of the heading address of the row A and constant set to the vector address register VAR0 and the increment register INR0.

These vector instructions are sent out to a vector instruction buffer 16 placed in the vector arithmetic control unit 8, respectively. The number L of vector elements to be processed is sent out to a vector length register 17 placed in the vector arithmetic control unit 8.

Figure 2:
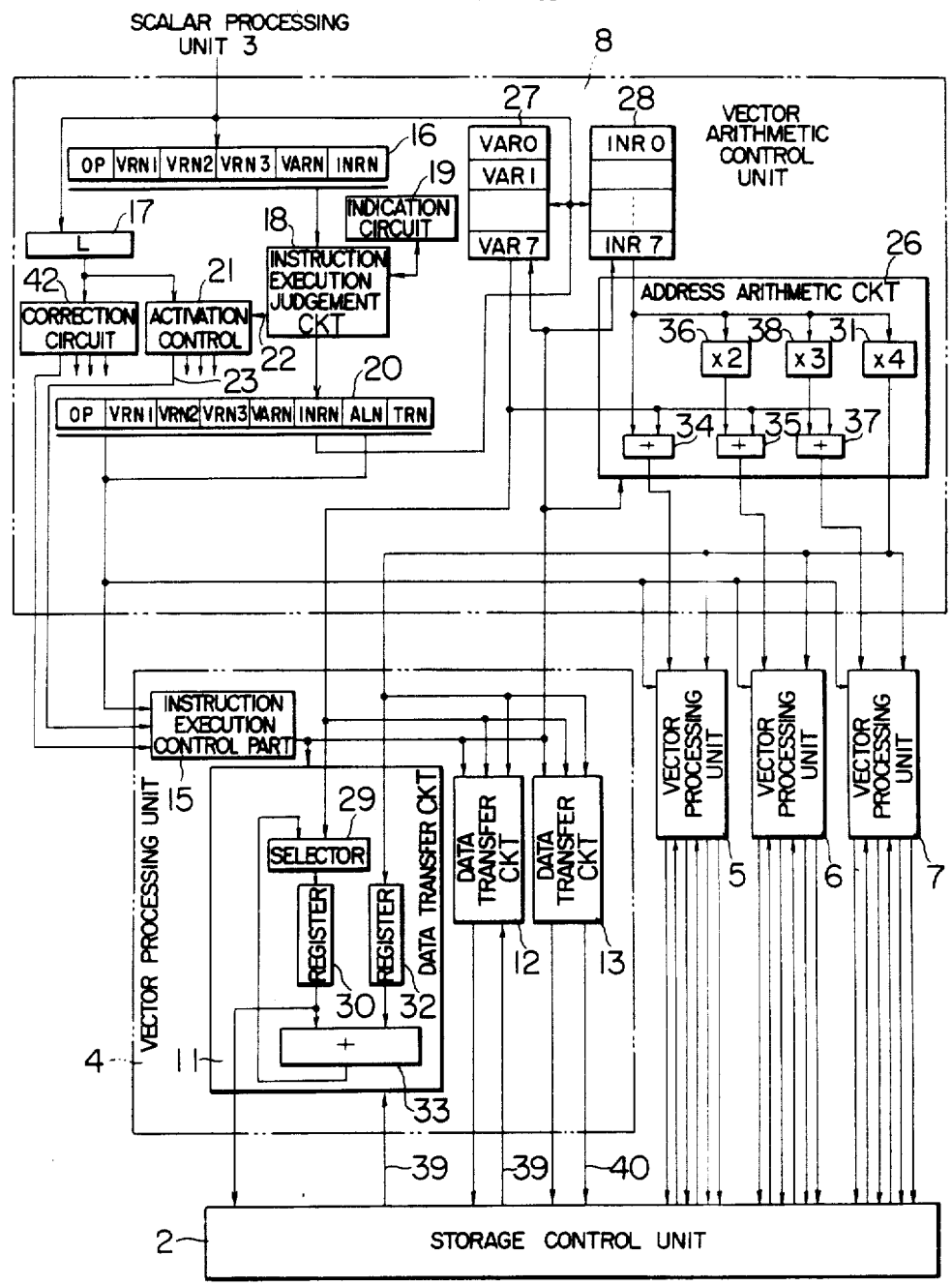
FIG. 2 is a block diagram showing the detail of the vector arithmetic control unit of FIG. 1 and the detail of the data transfer circuit in the vector processing unit of FIG. 1.

FIG. 2 shows the details of the vector arithmetic control unit 8, and the data transfer circuit 11, 12, 13 in the vector processing unit 4.

The operation of the vector arithmetic control unit 8 will be explained referring to FIGS. 1 and 2. The vector instruction buffer 16 to which the vector instructions are inputted from the scalar processing unit 3 as described above is subjected to instruction execution judgement by an instruction execution judgement circuit 18. The instruction execution judgement circuit 18 extracts one vector instruction from the heading extraction position of the vector instruction buffer 16 and judges if it is executable. Namely, a resource status indication circuit 19 is provided in common to the vector processing units 4–7, and is equipped with one indicator corresponding to each of the vector register 9, the vector arithmetic unit 10 and the data transfer circuits 11–13 in each vector processing unit, which indicates if they are in busy condition. For example, the indicator corresponding to the vector register VR1 is not provided correspondingly to each of the vector processing units 4–7, but only one indicator is provided. This applies to the other indicators.

The instruction execution judgement circuit 18 checks if the vector register 9 specified by the extracted vector instruction, the vector arithmetic unit 10 for performing the arithmetic specified by the vector command etc. are vacant or blank referring to the indicators, and judges the vector instruction to be executable when all the required elements are vacant. In this case the indicators corresponding to the vector register 9, the vector arithmetic unit 10 and the data transfer circuits 11–13 to be employed by the vector instruction are set to indicate that they are in a busy condition, and the vector instruction is sent out to an instruction register 20 and an activation signal 22 is also sent to an activation control circuit 21.

There is shown, in the vector instruction buffer 16 of FIG. 2, the format of one vector instruction sent from the scalar processing unit 3. There is shown, in the instruction register 20 of FIG. 2, the format of one vector instruction sent from the instruction execution judgement circuit 18. In these formats, OP denotes an operation code representative of the kind of operation or arithmetic, VRN1-3 a vector register specification part, and INRN an increment register specification part. Incidentally, some vector instructions (for example, the above VEA instruction) may not employ the vector address register, etc., and such a vector instruction does not require the corresponding specification parts. For convenience of explanation, it is hereinafter assumed that any of VRN's 1-3 exists, unless particularly noticed.

OP, VRN1-3, VARN, and INRN in the instruction register 20 are those which are sent from the vector instruction buffer 16 and outputted by the instruction execution judgement 18 as they are. Both ALN and TRN are newly added by the instruction execution judgement 18, and denote a vector arithmetic unit specification part and a data transfer circuit specification part, respectively, which specify the vector arithmetic unit and the data transfer circuit, respectively. These vector arithmetic unit and data transfer circuit correspond to the indicators newly set to busy condition by the instruction execution judgement circuit 18.

The vector processing apparatus now explained divides and executes one vector instruction by four vector processing units referring to the number of vector elements, as indicated below. Assuming that the vector element number is i, the vector processing units share their job as follows:

| Vector element number | Vector processing unit |
| --- | --- |
| i = 0, 4, 8 ... | 4 |
| i = 1, 5, 9 ... | 5 |
| i = 2, 6, 10 ... | 6 |
| i = 3, 7, 11 ... | 7 |

The parts other than VARN and INRN of the instruction register 20 sent to the instruction execution control part 15 in each of the vector processing units 4–7. Each instruction execution control part 15, when having received a unit activation signal from the activation control circuit 21, causes the corresponding vector processing unit to perform its vector processing operation on the basis of the information received from the instruction register.

Each instruction execution control part 15, in the case where the vector instruction to be executed is one which employs the vector register 9 and the data transfer circuit as LVR instruction or STVR instruction, sends any one of VRN's 1-3 and TRN to the connection path selection circuit 24 or 25. (Incidentally, LVR instruction or STVR instruction requires only one vector register to be used, which is now specified as VRN1.) Then, the connection path selection circuit 24 or 25 selects a connection path between the vector register 9 specified by VRN1 and the data transfer circuit specified by TRN to activate it. Each instruction execution control part 15 causes the contents of one of plural address registers 27 and one of plural increment registers 28 to be read out, respectively, on the basis of VARN and INRN in the instruction register 20.

The data transfer circuit in the vector processing unit 4, specified by TRN (hereinafter explained as the data transfer circuit 11) sends the content read out from the vector address register 27 to the storage control unit 2 as an access address through a selector 29 and a register 30. In the meantime, the data transfer circuit 11 also sends and inputs the content read out from the increment register 28 to an adder circuit 33 through a quadruple circuit 31 and a register 32 to obtain a sum with the content of the register 30. This sum is set to the register 30 through the selector 29. This new content is sent to the storage control unit 2 as an access address in the same manner as mentioned above. Hereafter, the same operation is repeated.

The data transfer circuit 11 placed in the vector processing unit 5 takes a sum of the content read out from the vector address register 27 and the content read out from the increment register 28 by an adder circuit 34 and sends it as an access address to the storage control unit 2 through the selector 29 and the register 30. In the meantime, the data transfer circuit 11 inputs the content read out from the increment register 28 to the adder circuit 33 through the quadruple circuit 31 and register 32 to obtain a sum with the content of the register 30. This sum is set to the register 30. This new content is sent to the storage control unit 2 as an access address in the same manner as mentioned above. Hereafter, the same operation is repeated.

The data transfer circuit 11 in the vector processing unit 6 is different from that in the vector processing unit 4 in only that the input of an adder circuit 35 corresponding to the adder circuit 34 is the content read out from the increment register 28 through a double circuit 36. The data transfer circuit 11 in the vector processing unit 7 is different from that in the vector processing unit 4 in that the input of an adder circuit 37 corresponding to the adder circuit 33 is the content read out from the increment register 28 through a triple circuit 38.

Incidentally, there is shown for the data transfer circuit 11 only one address arithmetic circuit 26 consisting of the adder circuits 34, 35 and 37, the double circuit 36, the triple circuit 38 and the quadruple circuit 31, but it is assumed that this address arithmetic circuit 26 is also provided for the other data transfer circuits 12 and 13. Therefore, in the case where the data transfer circuit 12 or 13 is specified by TRN, the instruction execution control part 15 sends a signal to the corresponding address arithmetic circuit to operate it.

The access address sent from the data transfer circuit 11 in each of the vector processing units 4-7 to the storage control unit 2 is applied to the main storage 1. Where the data transfer circuit 11 or 12 for fetching is specified by TRN, the data read out from the main storage 1 is sent to the data transfer circuit 11 or 12 through a signal line 39, and thereafter is loaded into the vector register 9 specified by VRN1 through the connection path selection circuit 24. On the other hand, where the data transfer circuit 13 for storing is specified by TRN, the data read out from the vector register 9 specified by VRN1 is sent to the data transfer circuit 13 through the connection path selection circuit 25, and thereafter is written or stored in the main storage 1 through a signal line 40 and the storage control unit 2.

Each instruction execution control part 15, in the case where the vector instruction to be executed is one which employs the vector registor 9 and vector arithmetic unit 10 as a VEA instruction, sends VRN's 1-3 and ALN to the connection path selection circuits 24 and 25. Then, the connection path selection circuits 24 and 25 select connection paths between three vector registers 9 specified by VRN's 1-3 and one vector arithmetic unit 10 specified by ALN to activate them. Thereafter, data is read out from two selected vector registers 9, and this data is subjected to an arithmetic operation by the selected vector arithmetic unit. The result of the arithmetic operation is set in another selected vector register 9.

As described above, one vector instruction is processed in its divisions by four vector processing units 4-7, which serve the elements of iMOD4=0, iMOD4=1, iMOD 4=2 and iMOD4=3 among L elements.

The connection path selection circuits 24 and 25 can simultaneously activate plural connection paths, respectively. Therefore, the instruction execution control part 15, if the specified vector register 9, vector arithmetic unit 10, and data transfer circuits 13 are vacant, successively initiates the execution of the vector instructions supplied from the instruction register 20, which permits plural vector instructions to be simultaneously executed.

Explanation will be made on the control of the number of vector elements to be processed by each of the vector processing units 4-7, referring to FIG. 3.

There is, in the instruction execution control part 15 in each of the vector processing units 4-7, one counter 41 corresponding to each of the vector registers, vector arithmetic units and data transfer circuits in each processing unit. Where the vector instruction to be executed is an LVR instruction or STVR instruction employing the vector register and the data transfer circuit, there are employed the counters corresponding to the vector register and the data transfer circuit specified by VRN1 and TRN, respectively. Where the vector instruction to be executed is VEA instruction employing the vector register and the vector arithmetic unit, there are employed the counters corresponding to the vector register and the vector arithmetic unit specified by VRN's 1-3 and ALN. The operation of these counters will be explained. Incidentally, there is shown in FIG. 3 only one counter 41 such as mentioned above, however there are other counters which operate in a similar manner as described above.

Data representative of the number L of vector elements is set to the vector length register 17 from the scalar processing unit 3. The part other than the low order two bits of the data is set to the counter 41 through a correction circuit 42 as it is. If the low order two bits of the vector length register 17 are "00", any output is not produced from the correction circuit 42. If they are "01", an output is supplied from an OR gate 43 in the correction circuit 42 to the counter 41 of the vector processing unit 4. If they are "10", outputs are supplied from the OR gate 43 and an output line 44 to the counter 41 of each of the vector processing units 4 and 5. If they are "11", outputs are supplied from the OR gate, the output line 44 and an AND gate 45 to the counter 41 of each of the vector processing units 4, 5 and 6. The counter 41 in each of the vector processing units 4-7 is counted up by 1 when the output is received from the correction circuit 42.

When the vector instruction is executed by each of the vector processing units 4-7, the counter 41 set in the manner mentioned above is counted down by 1 each time one vector element is processed. When the counter 41 is counted down to 0, it supplies an output to a signal line 46. The output on each of the signal lines 46 corresponding to the vector processing units 4-7 is sent to a counter 48 in the vector arithmetic control unit 8 through a priority circuit 47 therein. The priority circuit 47, the counter 48 and a final value register 49 are provided in common to the vector processing units 4-7, and prepared one by one for each of the vector registers 9, the vector arithmetic units 10 and the data transfer circuits 11-13. Incidentally, the final value register 49 is set to 4 when the activation signal 22 is outputted. The priority circuit 47, when outputs don't appear simultaneously on the signal lines 46, supplies the respective outputs to the counter 48 as they are. The priority circuit 47, when outputs simultaneously appear on the signal lines 46, supplies the respective outputs with time intervals shifted by a clock time to the counter 48. The counter 48 counts the outputs from the priority circuit 47. When the counter 48 is incremented to the value set in the final value register 49, a comparator 50 produces an output. The resource status indication circuit 19, on the basis of the output from the comparator 50, resets the indicators of the corresponding vector register, vector arithmetic unit and data transfer circuit to indicate vacancy, respectively.

The number L of vector elements less than 4 may be set to the vector length register 17. Thus, the activation control circuit 21 for activating the required number of vector processing units is provided in the vector arithmetic control unit 8. Now, this activation control circuit 21 will be explained referring to FIG. 3.

Where the vector element number L is 4 or more, when the activation signal 22 is outputted from the instruction execution judgement circuit 18, unit activation signals 23 are outputted from the activation control circuit 21 to all vector processing units 4-7. The final value register 49 is set to 4. Where L is 1, the unit activation signals 23 to be supplied to the vector processing units 5, 6 and 7 are inhibited by the actions of AND gates 54, 55 and 56 since a "1" detection circuit 51 in the activation control circuit 21 produces an output. Where L is 2, the unit activation signals 23 to be supplied to the vector processing units 6 and 7 are inhibited by the actions of AND gates 55 and 56 since a "2" detection circuit 57 produces an output. Where L is 3, the unit activation signal 23 to be supplied to the vector processing unit 7 is inhibited by the action of AND gate 56 since a "3" detection circuit 58 produces an output.

Incidentally, where L is less than 4, the number of the vector processing units to be activated is set to the final value register 49. The data to be set to the final value register 49 is obtained by counting the unit activation signals 23 to be sent to each vector processing unit through the same circuit as the priority circuit 47, for example.

The above explanation is directed to the case where one vector instruction is processed in its divisions by four vector processing units, but the vector processing apparatus may be designed to permit exchange for the vector processing by any number of 1-4 vector processing units, as required. For example, in the case of the vector instructions for obtaining the inner product or sum total and for obtaining a first order iteration operation, they should be processed by one vector processing unit.

The design or arrangement permitting exchange for the vector processing by any number of 1-4 vector processing units is as follows for example.

Figure 3:
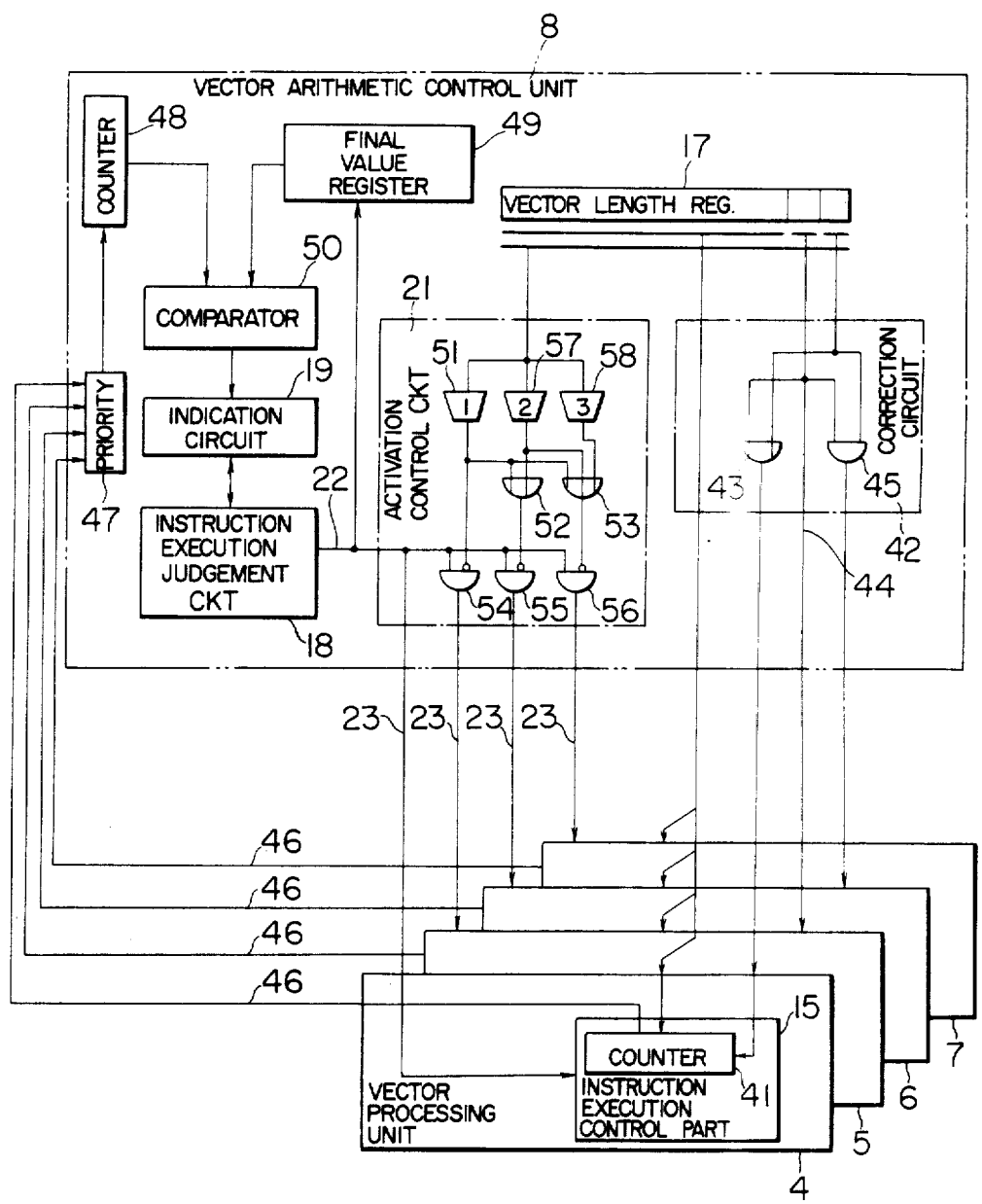
FIG. 3 is a block diagram showing the details of the vector arithmetic control unit of FIG. 1 and the instruction execution part therein.

In FIG. 3, gates are provided at the sides of the respective outputs of the AND gates 54-56 in the activation control circuit 21. Where the processing by only the vector processing unit 4 is intended, the outputs from the AND gates 54-56 are inhibited. Where the processing by only vector processing units 4 and 5 is intended, the outputs from the AND gates 55 and 56 are inhibited. The correction circuit 42 is constructed to select the path on which all bits of the vector length register 17 is supplied to only the vector processing unit 4, the path on which the part other than low order one bit is supplied to the vector processing units 4 and 5 and in the case of being 1 in the low order one bit, the counter 41 in the vector processing unit 4 is incremented by 1, and the other paths. Where the former path is selected, all vector elements are processed by only the vector processing unit 4. Where the latter path is selected, they are processed in its divisions by the vector processing units 4 and 5. Further, the address arithmetic circuit 26 is constructed so that the register 32 in the data transfer circuit of FIG. 2 is initialized as follow: Where the vector processing by only the vector processing unit 4 is intended, the register 32 in the data transfer circuit in processing unit 4 is initialized by the value itself read out from the increment register 28. Where the vector processing by only the vector processing units 4 and 5 is intended, the register 32 in the data transfer circuit in each of these processing unit is intialized by the double of the value read out from the increment register 28.

It is needless to say that the final value register 49 must be set to the number of the vector processing units to be activated.

In accordance with this invention, the employment efficiency of vector arithmetic units and/or the data transfer circuits can be enhanced since one vector instruction is processed in its divisions by plural vector processing units, which enables high speed vector processing.

It is further understood by those skilled in the art that the foregoing description is a preferred embodiment of the invention and that various changes and modifications may be made without departing from the spirit and scope of the invention.

I claim:

1. A vector processing system comprising:

main storage means for storing vector instructions and vector data;

a plurality of vector processing units connected to said main storage means for processing different vector elements, each of the vector processing units including:
  (1) a plurality of vector registers;
  (2) at least one vector arithmetic unit, selectively connected to receive vector data from a vector register, for processing said received vector data and for sending the result of processing to a vector register; and
  (3) at least one data transfer circuit for transferring data between said main storage means and said vector registers;

first holding means for holding the number of all the vector elements to be processed;

second holding means provided for each vector processing unit for holding the number of vector elements to be processed in each processing unit; and means for determining the numbers to be set in the second holding means on the basis of the number set in the first holding means.

2. A vector processing apparatus according to claim 1, wherein said second holding means comprises means for counting down by one each time one vector element is processed in the corresponding vector processing unit and means for detecting when the content of the second holding means reaches a predetermined value.

3. A vector processing apparatus according to claim 1, wherein each vector processing unit includes a plurality of vector arithmetic units and a second holding means is provided for each of said vector arithmetic units in the corresponding vector processing unit.

4. A vector processing apparatus according to claim 1, wherein each vector processing unit includes a plurality of data transfer circuits and a second holding means is provided for each of said data transfer circuits in the corresponding vector processing unit.

5. A vector processing system comprising:

a main storage;

a plurality of vector processing units connected to said main storage for performing processing on respectively different vector elements, each of said vector processing units including:
  (1) a plurality of vector registers;
  (2) at least one vector arithmetic unit, selectively connected to receive vector data from a vector register, for processing said received vector data and for sending the result of processing to a vector register; and
  (3) at least one data transfer circuit for transferring data between said main storage means and said vector registers;

control means for controlling said plurality of vector processing units to execute vector instructions read from said main storage, including means for supplying to the vector processing units addresses of the main storage for mutually different vector elements so that the vector processing units process mutually different vector elements.

* * * * *